Nov. 28, 1961
A. L. CHADWICK
3,010,592
LIFTING AND TRANSPORTING APPARATUS
Filed May 26, 1958
3 Sheets-Sheet 1
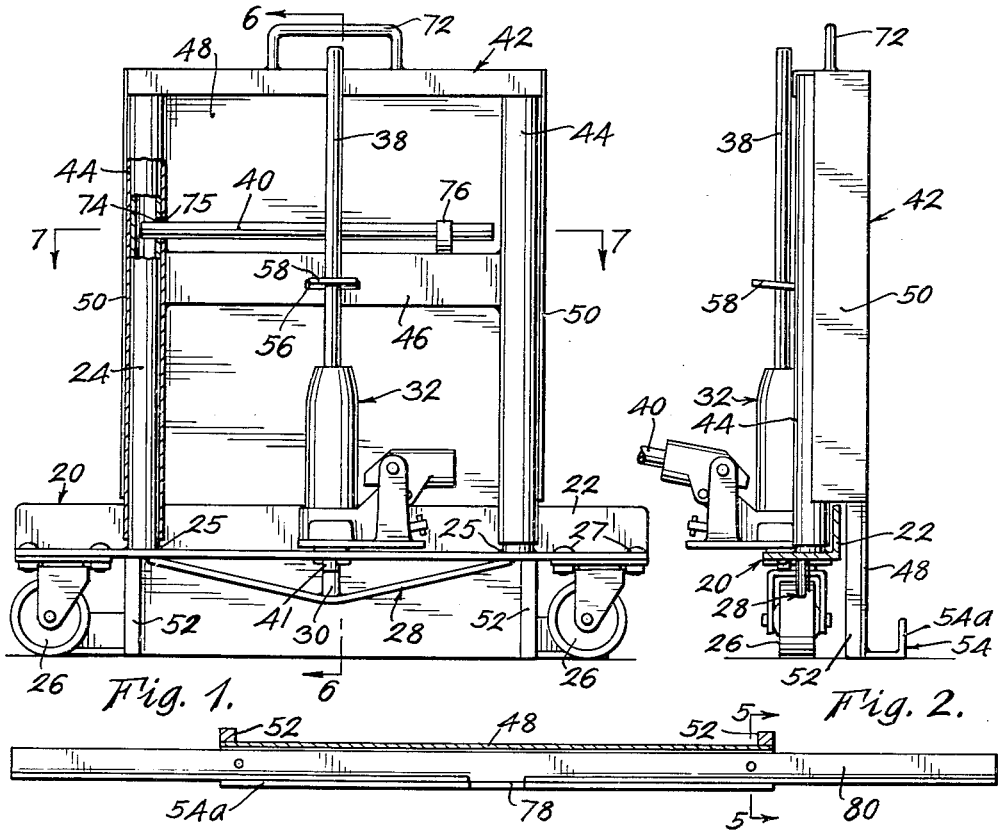
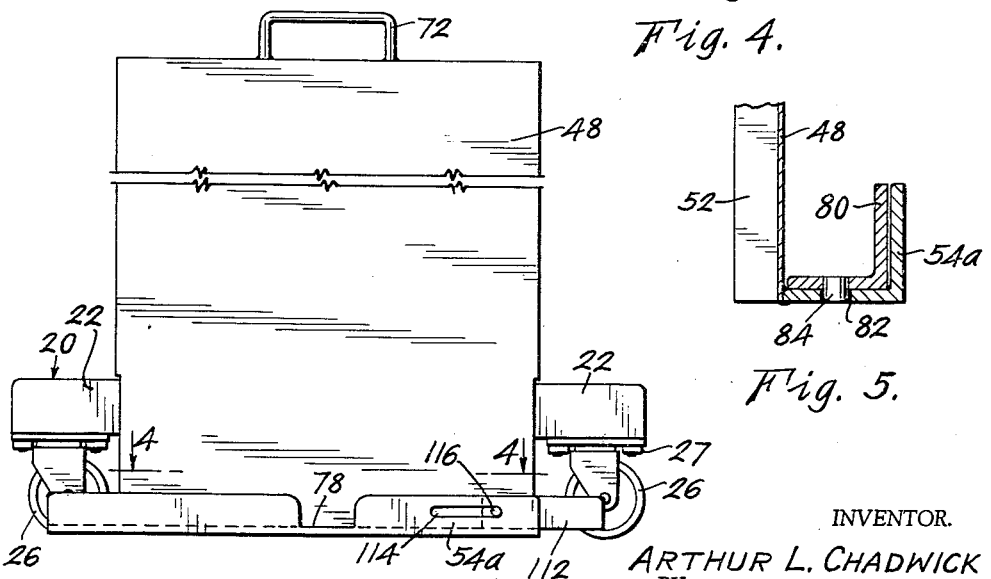
INVENTOR.
ARTHUR L. CHADWICK
BY
Max L. Wymore
ATTORNEY

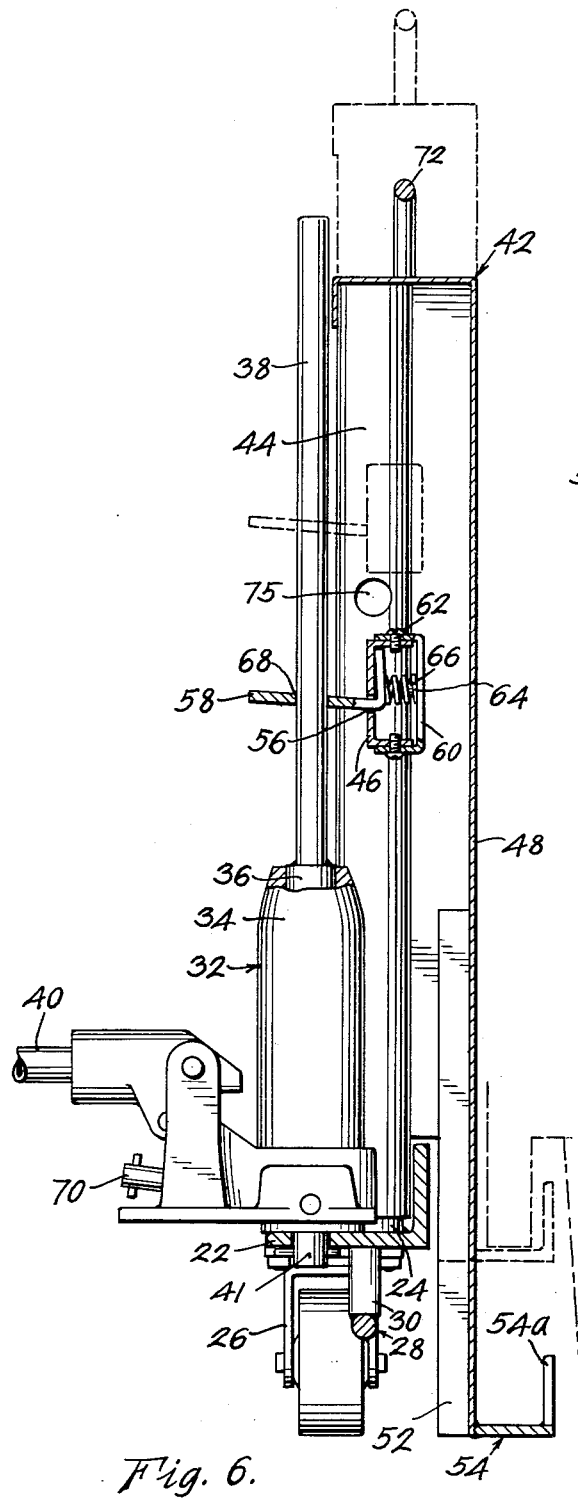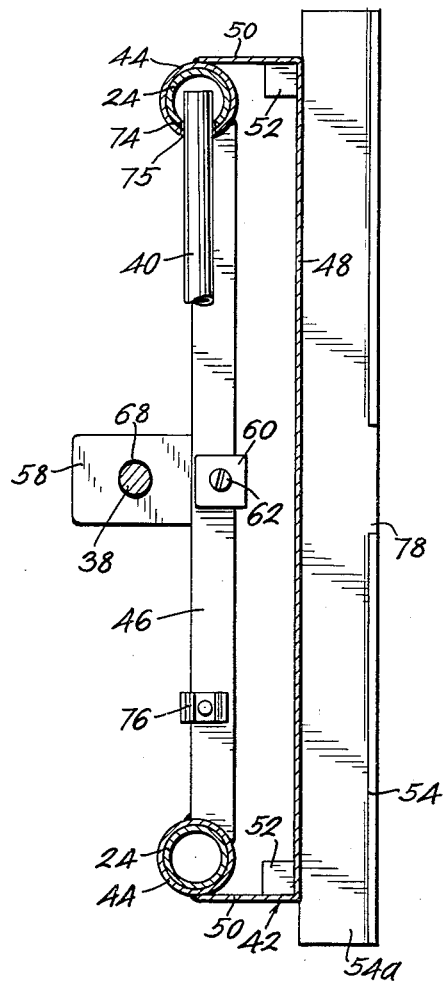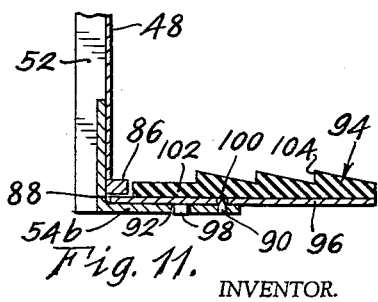

Nov. 28, 1961  A. L. CHADWICK  3,010,592
LIFTING AND TRANSPORTING APPARATUS
Filed May 26, 1958  3 Sheets-Sheet 3
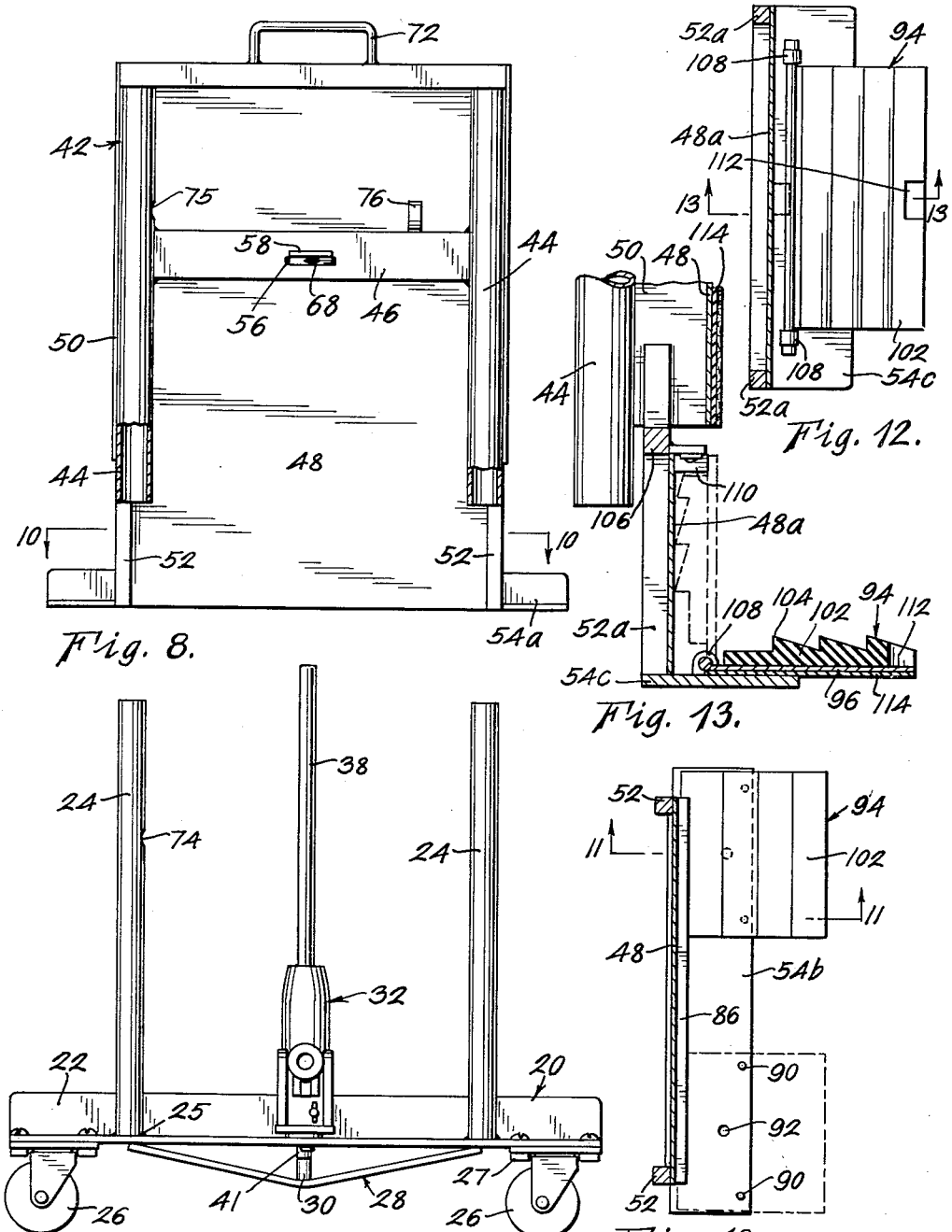
INVENTOR.
ARTHUR L. CHADWICK
BY
Max L. Wymore
ATTORNEY United States Patent Office 3,010,592
Patented Nov. 28, 1961

3,010,592
LIFTING AND TRANSPORTING APPARATUS
Arthur L. Chadwick, Denver, Colo., assignor to Chadwick Enterprises, Denver, Colo., a corporation of Colorado
Filed May 26, 1958, Ser. No. 737,784
8 Claims. (Cl. 214—390)

This invention relates to improvements in load lifting and transporting apparatus and more particularly, to such apparatus adapted, but not exclusively, for use in lifting and transporting display counters, household appliances, furniture and other bulky items difficult to lift and transport.

Numerous attempts have been made in the past to provide a lifting and transporting apparatus which may easily and conveniently be positioned in operative position to a load, whereby such a load may be quickly and easily moved about from one place to another with a minimum of effort. Each such apparatus has been subject to one or more disadvantages in not being adapted for use with various types of loads and an excessive amount of time required to adjust to loads that vary in height from the surface on which they are resting.

It is therefore an important object of this invention to provide an improved lifting and transporting apparatus which avoids one or more of the disadvantages of the prior art apparatus and which may be more rapidly adjusted to loads having surfaces by which they are to be lifted of varying height from a floor, dock and the like.

It is a further important object of the invention to provide improved lifting and transporting apparatus which is simple and inexpensive in construction yet rugged and serviceable and is adapted for use with a wide variety of loads.

It is a further important object of the present invention to provide an easily-maneuvered lifting apparatus which enable quick and easy handling of otherwise cumbersome loads by one man.

It is a further imortant object of this invention to provide an improved lifting and transporting apparatus which may be readily carried about and occupies a minimum of space both in use and in storage.

In accordance with the invention, the improved lifting and transporting apparatus comprises a relatively stationary frame having a cross member with depending ground engaging wheels adjacent either end thereof and a pair of laterally spaced vertical side members attached to the horizontal cross member. A vertical slidable frame comprised of laterally spaced side members and having at least one horizontal cross member is slidably mounted on the vertical side members of the relatively stationary frame for vertical movement. The slidable frame is provided with at least one depending load engaging element. A vertically extensible and contractable jack means having an elongated extensible member is mounted on the horizontal cross member of the relatively stationary frame and a locking means is mounted on the horizontal cross member of the slidable frame adapted to engage the elongated extensible member of the jack means to selectively position and lock the slidable frame against movement relative to the extensible member.

For a better understanding of the present invention, together with other and further objects thereof, reference is had to the following description taken in connection with the drawings and its scope will be pointed out in the appended claims.

In the drawings:

FIGURE 1 is a rear elevation of the apparatus according to the invention;

FIGURE 2 is a side view of FIGURE 1;

FIGURE 3 is a front view of the apparatus of FIGURE 1;

FIGURE 4 is a view along line 4—4 of FIGURE 3 with the addition of one embodiment of a load engaging element of the invention;

FIGURE 5 is a view along line 5—5 of FIGURE 4;

FIGURE 6 is a view of an enlarged scale partly in section, along line 6—6 of FIGURE 1;

FIGURE 7 is a view to an enlarged scale along line 7—7 of FIGURE 1;

FIGURES 8 and 9 in combination comprise an exploded view of the apparatus of FIGURE 1 showing the slidable frame separated from the relatively stationary frame;

FIGURE 10 is a plan view along line 10—10 of FIGURE 8 showing another embodiment of a load engaging element of the invention;

FIGURE 11 is a view along line 11—11 of FIGURE 10;

FIGURE 12 is a plan view showing still another embodiment of a load engaging element of the invention, and FIGURE 13 is a view along line 13—13 of FIGURE 12.

Referring to FIGURES 1 and 9 of the drawing, the apparatus of this invention is seen to comprise a relatively stationary frame, generally designated by the numeral 20, comprising a horizontal cross member 22 which preferably is of angle bar cross section, as illustrated in FIGURE 2. Laterally spaced vertical side members 24 are attached to cross member 22 and secured thereto as by welding 25 or the like, illustrated best in FIGURE 9. Side members 24 are preferably of tubular cross section. Swivel casters 26 depend from either end of cross member 22 and are secured thereto by means of bolt fasteners 27 and the like. A V-shaped truss brace generally designated by numeral 28 may be attached to the lower surface of cross member 22 at points beneath the side members 24 as by welding or the like and having a vertical support column 30 positioned between the under surface of cross member 22 and the point of the V and secured thereto by welding. Brace 28 may conveniently be used where greater rigidity of cross member 22 is desired without the necessity of using heavier stock for cross member 22 and increasing the weight of the apparatus.

A suitable lifting device, generally designated by numeral 32, is shown mounted on the horizontal cross member 22. This lifting device is preferably in the form of a hydraulic jack and comprises a cylinder 34 which is secured to cross member 22 and a plunger or piston 36 which is slidable in the cylinder and to the upper surface of which is attached an elongated upwardly projecting member 38, which cooperates with plunger 36 to form an elongated extensible member. This arrangement is best illustrated in FIGURE 6. The lifting device 32 has a suitable operating handle 40. The jack 32 is preferably mounted for relative rotation upon the cross member 32 whereby its operating handle 40 may be swung about a vertical axis to any desired position. This may be conveniently accomplished by providing a bore hole in cross member 22 to receive a stub shaft 41 attached to the lower surface of jack 32 and secured against removal by a cotter key or the like.

A vertical slidable frame, generally designated by numeral 42, is shown as comprising laterally spaced side members 44 adapted to telescope with the side members 24 of the relatively stationary frame 20, as shown in FIGURE 1. A horizontal cross member 46 is attached at either end to side members 44 as by welding or the like to form a rigid frame structure. A metal plate 48 having 90 degree bends at the side edges to form a channel having flanges 50 is positioned on the side of frame 42 away from jack 32 when the frames are assembled in telescoping relation. A flange 50 on either side of plate 48 is attached to a respective side member 44 as by welding in the manner shown in FIGURE 7. The flanges are of a length sufficient to provide a space between side members 44 and plate 48 to receive vertical supports 52. Supports 52 are preferably of rectangular cross section and are secured at either edge of plate 48 within the 90 degree bend. Supports 52 are of a length sufficient to impart rigidity to the lower portion of plate 48, the lowermost portion of which, when frames 20 and 42 are completely telescoped together, rests in ground contacting relation to casters 26 such as to maintain plate 48 in a vertical plane. Load engaging means generally designated by numeral 54 are secured to plate 48 adjacent the lowermost edge thereof. Load engaging means may be comprised of an angle bar 54a having the edge of one leg attached to plate 48 as shown in FIGURES 1 through 8 or comprise a flat plate 54b with an edge attached to plate 48 as shown in FIGURES 10 through 13. The load engaging means will be described in greater detail as the description progresses.

As best seen in FIGURE 6 horizontal cross member 46 is preferably in the form of a channel mounted with the flanges thereof positioned toward plate 48. A horizontal longitudinal slot 56 is positioned centrally in the web of horizontal cross member 46. An L-shaped dog 58 having a long leg and a shorter leg is positioned with the long leg passing through slot 56 and the shorter leg between the flanges of cross member 46 projecting upwardly. The included angle between the long and shorter leg of dog 58 is preferably slightly less than 90 degrees for the purpose to be explained further in the description. A short length of channel 60 is positioned with the flanges thereof in opposed mating relation to the flanges of cross member 46 opposite slot 56. The flanges of channel 60 are secured to the flanges of cross member 46 by means of screws 62. A spring 64 is positioned between the shorter leg of dog 58 and the web of channel 60 urging the shorter leg of dog into parallel relation with the web of the channel of cross member 46. Spring 64 is maintained in urging position by having one end thereof positioned over a projection 66 attached to channel 60.

The long leg of dog 58 is provided with a hole 68 located therein. The diameter of hole 68 is slightly greater than the cross sectional diameter of extensible member 38. Hole 68 is located and adapted to receive extensible member in free sliding relation when the slidable frame 42 is telescopically assembled on relatively stationary frame 20 and when the long leg of dog 58 is in a position normal to extensible member 38 such that the hole 68 is axially aligned with extensible member 38.

Referring again to FIGURE 6, it will be seen that with the included angle between the long and shorter legs of dog being less than 90 degrees, the long leg will be urged beyond the horizontal by spring 64 such that the dog 58 will frictionally engage and lock dog 58 and attached slidable frame 42 against downward relative movement with respect to extensible member 38 of jack 32. By depressing the outer end of the long leg of dog 58 against spring 64, the slidable frame 42 may be repositioned and locked at any one of several positions with respect to extensible member 38 shown by the dotted lines of FIGURE 6, easily and quickly.

In operation, the transporting apparatus of this invention may be positioned with the load engaging means 54a under a load, shown as dot-dash lines in FIGURE 6, where the portion by which the load is to be lifted is above the level of a floor on which the load is resting. By lifting on handle 72 attached to the slidable frame 42, the slidable frame and load engaging means 54a may be quickly raised and locked into engagement with the load. Valve handle 70 is turned closing the valve of hydraulic jack 32 and the cylinder 36 and attached extensible member 38 are raised by operating handle 40. Since the slidable frame 42 and load engaging means 54a are locked against downward movement relative to extensible member 38 by means of dog 58, slidable frame 42 and load engaging means 54a will be raised, lifting the load from the surface on which it rested. It will be appreciated that a similar lifting apparatus according to this invention may be positioned on the opposite of the load, such that when the load is lifted by each apparatus, the load is easily supported and moved on caster wheels 26.

For storage and easy transportation of the apparatus of this invention from one location to another, the slidable frame 42 may conveniently be provided with a handle 72. Since lifting on handle 72 will generally cause dog 58 to release extensible member 38 and allow slidable frame 42 to be raised relative to the relatively stationary frame 20 and possibly separate therefrom. For storage purposes, holes 74 and 75 are provided in one of a pair of vertical members 24 and 44 respectively to be in alignment when the lower edge of plate 48 and load engaging means 54 are in contact with the ground and plate 48 is positioned in a vertical plane. Holes 74 and 75 are of a size to receive jack handle 40 which is held in place by means of clip 76. With handle 40 positioned in holes 74 and 75 of members 24 and 44 and held in place by clip 76, the apparatus can be lifted by means of handle 72 without danger of the frames separating. Further, since the lower edge of plate 48 and the lower surface of caster 26 are in a horizontal plane while plate 48 is in a vertical plane, the apparatus may be stored in an upright position without danger of falling over.

Referring to FIGURES 2 and 3, it will be noted that load engaging means 54a comprises an angle iron having the edge of one flange secured to plate 48 such that one flange is horizontal and at right angles to plate 48 while the other flange is vertical and parallel therewith projecting upwardly from the lower edge of plate 48. As shown in FIGURE 3, the upwardly projecting vertical flange of load engaging means 54a may be provided with a centrally positioned notch 78 to facilitate lifting a load, such as a double display counter having a projecting rib centrally positioned between the counters. In lifting such counters, this rib is allowed to fit into notch 78 such that the rib will not be damaged and the lifting force is applied equally along the edge of the counter. Referring to FIGURES 4 and 5, an extension angle iron 80, having a centrally located notch similar to 78, may be removably positioned within the 90 degree angle of load engaging means 54a to provide increased width of the load bearing surface. The horizontal flange of load engaging means 54a is provided with a plurality of holes 82 therein and angle iron 80 is provided with a plurality of projections 84 which mate with holes 82 to prevent lateral displacement of angle iron 80 with respect to load engaging means 54a.

Referring now to FIGURES 10 and 11, in the embodiment shown, plate 48 is seen to terminate above the lower ends of vertical brace members 52. A load engaging means 54b comprising an angle bar has a vertical flange secured behind plate 48 as by welding in a lap joint with the other flange positioned horizontally to project outwardly from plate 48. The horizontal flange is positioned vertically such that the lower surface thereof is flush with the lower ends of brace members 52. A bar 86 having a rectangular cross section is fastened to the lower edge of plate 48 and to the vertical flange of load bearing means 54b spaced from and parallel to the horizontal flange thereof to provide a horizontal groove 88 therebetween. The horizontal flange is provided with a plurality of spiked projections 90 on its upper surface adjacent to and substantially in alignment with the outer edge thereof. The horizontal flange is further provided with a plurality of holes 92 therethrough along the length thereof for the purpose to be explained. The spiked projections 90 serve as a load holding means when the horizontal flange of load engaging means 54b is positioned under a load such as a packing crate and the like where indentations caused by the spikes are not objectionable.

Certain types of loads which are to be lifted require precautions against scratching or marring, for example, white goods such as refrigerators, washing machines and the like. For use with such loads one or more auxiliary load contacting means generally designated by number 94 may be used, FIGURES 10 and 11. The load contacting means comprises a metal plate 96 which is positioned with one edge thereof in receiving relation within groove 88 between bar 86 and the horizontal flange of load engaging means 54b. The lower surface of plate 96 is provided with a plurality of projections 98 which are in registry with holes 92 of the horizontal flange when the edge of plate 96 is in groove 88. Plate 96 is further provided with holes 100 therethrough adapted to receive spiked projections 90 on the upper surface of the horizontal flange when plate 96 is in position. A protective and load securing member 102 is attached to the upper surface of plate 96. Member 102 is comprised of a resilient material such as an elastomer, rubber and the like with the upper surface thereof being provided with a plurality of ribs 104 with the peaks thereof inclined rearwardly and, when plate 96 is positioned on load engaging means 54b, toward plate 48. The outer edge of securing means 102 is of a thickness substantially equal to the trough height between ribs 104 and the inner edge of 102 adjacent bar 86 is also of a thickness substantially equal to the trough height between ribs 104. The resiliency of protecting and securing means 102 permits lifting of loads where the surfaces must be protected and the ribs 104 afford sufficient frictional engagement to prevent unintentional release of the load once it is lifted.

The load contacting means 94 can be readily detached from load engaging means 54b and is subject to being misplaced. In certain instances it may be desirable that load contacting means 94 be substantially permanently attached to the slidable frame 24. This embodiment is best shown in FIGURES 12 and 13. Referring first to FIGURE 13, it will be noted that plate 48 has been terminated at its lower edge slightly above the lower ends of side members 44. A pair of vertical members 52a are seen to depend from flanges 50 some distance behind plate 48 to form a recess and are secured thereto as by welding and the like. A horizontal cross member 106 is secured at either end to vertical members 52a adjacent the lower edge of plate 48. A plate 48a is fastened to the front of vertical members 52a and a load engaging means 54c in the form of a flat plate is attached to the lower ends of vertical members 52a and plate 48a as by welding. Load contacting means 94 is hingedly connected to the top of load engaging means 54c by hinge 108 and is adapted to be pivoted about hinge 108 into the recess formed by plate 48a with respect to plate 48 such that plate 96 of load contacting means 94 is substantially flush with plate 48 in the raised position. The load engaging means may be held in raised position by means of a magnetic latch in the form of a magnet 110 which may conveniently be mounted on plate 48a near the upper edge thereof. The protective member 102 of load engaging means 94 has a notch 112 cut therein near the forward edge thereof to expose plate 96 in mating relation to magnet 110 when in the raised position as shown by dotted lines in FIGURE 13. To store the load contacting means it is only necessary to raise same into contracting relation to magnet 110 which holds same within the recess formed by plate 48a. The lower surface of plate 96 as well as the front of plate 48 may conveniently be covered with a protective material 114 in the form of a layer of carpeting, rubber and the like to protect the load from being scratched when it is being moved. Load engaging means 54c may be provided with a plurality of pointed projections, in the manner shown in FIGURES 10 and 11, for engaging crating with contacting means 94 in raised position. Plate 96 may be provided with mating holes to receive the pointed projections when engaging means 94 is lowered.

The apparatus herein disclosed has been found extremely practical for use in shipping rooms, railroad freight houses, factories, store rooms, in department stores and appliance stores, and wherever heavy bulky units must be handled and shifted about from one place to another with considerable care. By the employment of the novel lifting apparatus herein disclosed, one or two men may handle practically any size load gently with ease and in a minimum of time. The operation of the apparatus is simple and straightforward allowing an inexperienced person to place it under a load or removing same quickly and efficiently. When transporting heavy loads from one place to another, two lifting apparatus are employed. One is applied to each end of the load, whereby the entire load will be supported on casters 26 which are of ample size to permit the load to be readily rolled over relatively rough floors, and the like, without difficulty. The construction of the lifting apparatus is quite simple and inexpensive and the all-welded construction provides a rugged and substantial apparatus of this type which offers the utmost in convenience of operation and long life.

As shown in FIGURE 3, one end of load engaging element 54a may be provided with an extensible member 112 in the form of an angle bar slidably positioned within the angle of the load engaging element. An elongated slot 114 is provided in the vertical flange of the load engaging element and a rod 116 attached to extensible member 112 passes through slot 114 to form a handle. Where it is desired to move an unloaded pallet, preparatory to loading, the extensible member 112 is retracted by means of bar 116. The lifting and transporting apparatus is positioned under an end of the pallet with the non-extensible end of load engaging element 54a behind one of the legs of the pallet. The extensible member 112 is then extended by means of rod 116 to be positioned behind the other leg of the pallet securing the lifting and transporting apparatus to the pallet. This arrangement permits the lifting and transporting apparatus to be secured to a pallet, prior to loading for moving same to a desired location for loading. It is to be understood that a lifting and transporting apparatus would be attached to each end of the pallet.

In the drawings, the means for vertically translating the relatively movable frame 42 upon the relatively stationary frame 20 is shown as comprising a hydraulic jack. It is to be understood that any means which is applicable for the purpose may be utilized for thus translating the relatively movable frame without departing from the scope of the invention.

While there have been described what at present are considered to be the preferred embodiments of this invention, it will be obvious to those skilled in the art that various changes and modifications may be made therein without departing from the invention. It is aimed therefore, in the appended claims to cover all such changes and modifications which fall within the true spirit and scope of the invention.

What is claimed is:

1. In apparatus of the class described, a relatively stationary frame having a horizontal cross member with depending ground engaging wheels adjacent either end thereof, said frame having laterally spaced vertical side members secured to the horizontal cross member at spaced points, a vertically slidable frame comprising laterally spaced vertical side members slidably mounted on said vertical side members of the relatively stationary frame for vertical movement, said slidable frame having at least one horizontal cross member secured to the vertical side members thereof, at least one load engaging means depending from said slidable frame and normally positioned adjacent the ground, a vertically extensible and contractable jack means having an elongated extensible member, said jack being mounted on the horizontal cross member of the relatively stationary frame with the elongated extensible member in a vertical position and locking means mounted on a horizontal cross member of the slidable frame adapted to engage said extensible member to selectively position and lock the slidable frame against movement relative to said extensible member.

2. Apparatus as set forth in claim 1, wherein the jack means comprises a hydraulic jack having an elongated extension secured to the moveable piston in axial alignment therewith and the locking means comprises means adapted to frictionally engage the elongated extension of said jack means and be restrained against relative axial movement with the elongated extension in one direction and being releasable for movement with respect to the elongated extension along its axis in the other direction.

3. Apparatus as set forth in claim 1, wherein the load engaging means comprises an angle bar having an edge of one flange thereof secured to the lower edge of the vertical slidable frame and positioned such that the flange is normal thereto with the other flange being parallel and coextensive with the slidable frame, the vertical flange being cut away centrally to provide a centrally located notch therein.

4. Apparatus as set forth in claim 1, wherein the load engaging means comprises plate means secured to the lower edge of the vertical slidable frame normal thereto and the plate means being provided with a plurality of spiked projections along the upper surface thereof adjacent the edge remote of said vertical slidable frame.

5. Apparatus according to claim 3, wherein the horizontal flange of the load engaging means has a plurality of holes therein along its length and the load engaging means further includes a second angle bar of somewhat greater length than the first angle bar positioned within the flanges of the first angle bar with the flanges of both angle bars mating, the horizontal flange of the second angle bar having projections on the bottom thereof mating with the holes in the horizontal flange of the first angle bar to restrain the second angle bar against lateral displacement with respect to the first angle bar and the vertical flange of the second angle bar having a notch therein in registry with the notch in the vertical flange of the first angle bar.

6. In an apparatus of the class described, a primary frame having a horizontal cross member with depending ground engaging wheels adjacent either end thereof, said frame having laterally spaced vertical side members secured to the horizontal member at spaced points, a secondary vertically slidable frame comprising laterally spaced vertical side members slidably mounted on said vertical side members of the primary frame, said secondary frame having a horizontal cross member secured to the vertical side members intermediate the ends thereof, at least one load engaging element depending from the secondary frame and normally positioned adjacent to the ground, a vertically extensible and contractable jack means having an elongated extension, said jack means being mounted on the horizontal cross member of the primary frame and locking means mounted on the horizontal cross member of the secondary frame adapted to engage said extension and lock the secondary frame against movement relative to said extension of the jack means.

7. In apparatus of the class described, a relatively stationary frame having a horizontal cross member with depending ground engaging wheels adjacent either end thereof, said frame having laterally spaced vertical side members secured to the horizontal cross member at spaced points, a vertically slidable frame comprising laterally spaced vertical side members slidably mounted on said vertical side members of the relatively stationary frame for vertical movement, said slidable frame having at least one horizontal cross member secured to the vertical side members thereof, at least one load engaging means depending from said slidable frame and normally positioned adjacent the ground, a vertically extensible and contractable jack means having an elongated extensible member, said jack being mounted on the horizontal cross member of the relatively stationary frame and locking means mounted on a horizontal cross member of the slidable frame adapted to engage said extensible member to selectively position and lock the slidable frame against movement relative to said extensible member wherein the load engaging means comprises plate means secured to the lower edge of the vertical slidable frame normal thereto, a second plate overlying said first plate and hingedly connected thereto and the vertical slidable frame having a recessed portion adapted to receive the second plate whereby the second plate when rotated about the hinged connection may be secured within said recessed portion of the vertical slidable frame for storage.

8. In apparatus of the class described, a relatively stationary frame having a horizontal cross member with depending ground engaging wheels adjacent either end thereof, said frame having laterally spaced vertical side members secured to the horizontal cross member at spaced points, a vertically slidable frame comprising laterally spaced vertical side members slidably mounted on said vertical side members of the relatively stationary frame for vertical movement, said slidable frame having at least one horizontal cross member secured to the vertical side members thereof, at least one load engaging means depending from said slidable frame and normally positioned adjacent the ground, a vertically extensible and contractable jack means having an elongated extensible member, said jack being mounted on the horizontal cross member of the relatively stationary frame and locking means mounted on a horizontal cross member of the sliadable frame adapted to engage said extensible member to selectively position and lock the slidable frame against movement relative to said extensible member wherein a bar of rectangular cross section is attached to the vertical slidable frame parallel to and spaced from the plate means to form a horizontal slot between the plate means and the bar, the plate means having a plurality of holes along the length thereof, at least one second plate means having a projection on one surface thereof adapted, when an edge of second plate is inserted into the horizontal groove between the first plate means and said bar, to mate with a hole in the first plate in receiving relation and the other surface of the second plate has secured thereto a resilient material terminating short of the bar when the second plate is in position, said resilient material being shaped to provide at least one transverse rib inclined toward the vertical slidable frame.

References Cited in the file of this patent

UNITED STATES PATENTS

| | | |
|---|---|---|
| 1,965,944 | Lea | July 10, 1934 |
| 2,114,398 | Nagai | Apr. 19, 1938 |
| 2,305,284 | Trabant | Dec. 15, 1942 |
| 2,463,381 | Hicks | Mar. 1, 1949 |
| 2,659,506 | Watkins | Nov. 17, 1953 |
| 2,706,535 | Marshall | Apr. 19, 1955 |

FOREIGN PATENTS

| | | |
|---|---|---|
| 285,324 | Switzerland | Jan. 5, 1953 |
| 811,211 | Germany | Aug. 16, 1951 |